Nov. 21, 1950     J. H. WURSTER     2,531,185
ROLLED TYPE CAPACITOR
Filed June 26, 1948
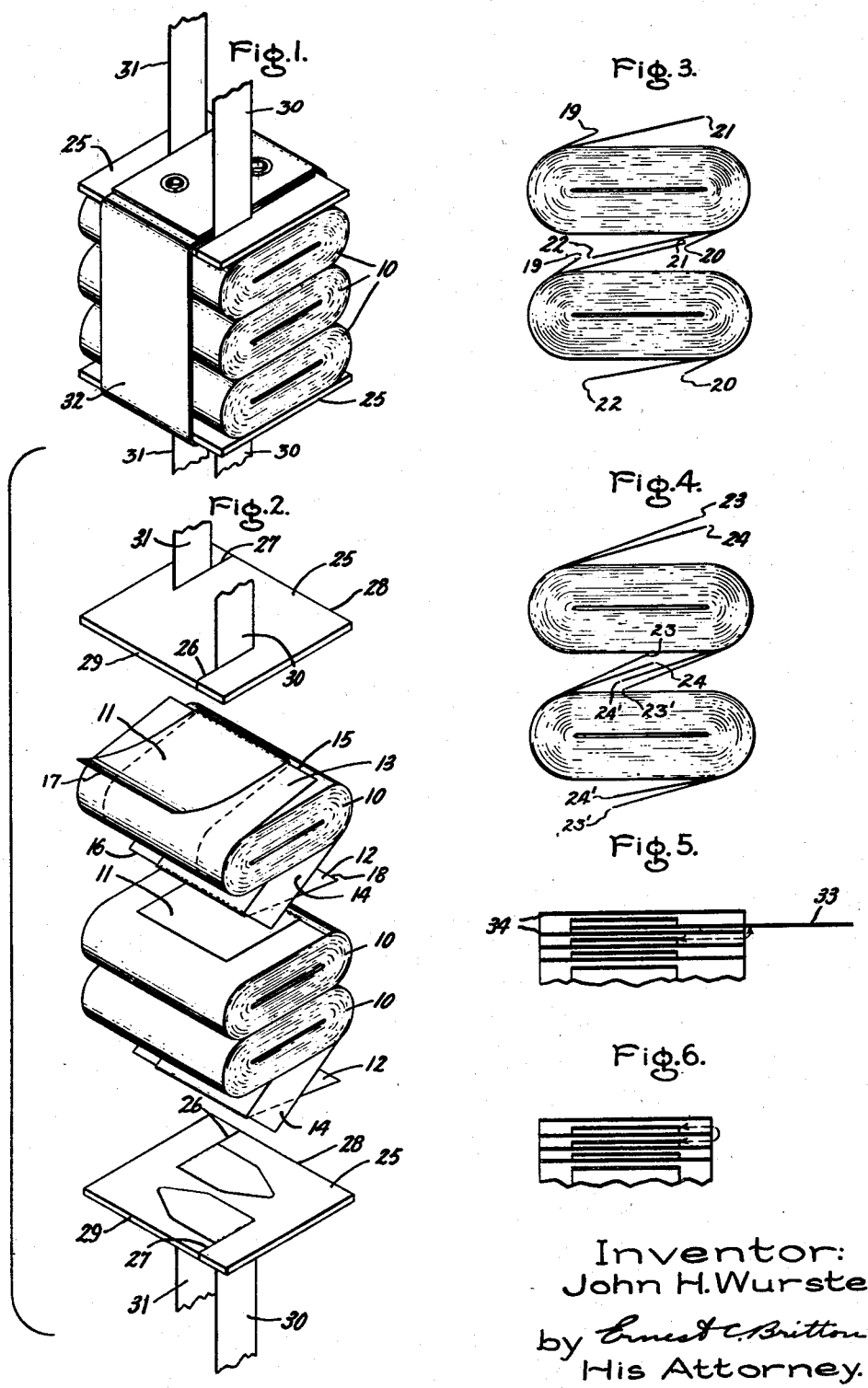
Inventor:
John H. Wurster,
by Ernest C. Britton
His Attorney.

Patented Nov. 21, 1950

2,531,185

UNITED STATES PATENT OFFICE 2,531,185

ROLLED TYPE CAPACITOR

John H. Wurster, Pittsfield, Mass., assignor to General Electric Company, a corporation of New York Application June 26, 1948, Serial No. 35,372

8 Claims. (Cl. 175—41)

This invention relates to electric capacitors or condensers and more particularly to an improved construction for a wound or rolled type capacitor.

The conventional prior art rolled type capacitor consists essentially of alternate longitudinal strips or sheets of metal foil conducting material and similar but wider strips of insulating or dielectric material wound into a compact roll which is sometimes thereafter flattened for various reason. During the winding operation, strips of conducting material, commonly called tap straps, are inserted respectively between conducting foils of opposite polarity and an adjacent strip of dielectric material. These straps project in an axial direction from the wound roll and serve to electrically connect conducting foils of opposite polarity therein with external terminals on the capacitor enclosing case.

Such tap straps reduce the insulating margin or creep distance between foils of opposite polarity and, when it is desired to employ dielectric strips therebetween having a constant width, as is usually the case, necessitate a greater overall length of the capacitor in an axial direction than would be necessary if tap straps were not used. Moreover, tap straps tend to tear the foil and dielectric material and also are expensive to use.

It is, therefore, an object of my invention to provide a rolled type capacitor construction which permits dispensing with the employment of all tap straps as used in the prior art.

It is also an object of my invention to provide a rolled type capacitor construction, a plurality of which may be electrically connected in series relationship without the use of tap straps, external interconnecting wires or separate connecting means of any description.

It is a further object of my invention to provide a novel means for electrically connecting a foil within a capacitor roll or a plurality of such rolls with an external terminal.

In accordance with my invention, the outer end portion of a wound conducting foil of a given polarity and the wound dielectric strip adjacent the outer surface thereof are terminated at one side of a capacitor roll while the outer end portion of a conducting foil of opposite polarity and the dielectric strip adjacent its outer surface are terminated at the opposite side of the roll in various ways so that each conducting end portion may be conveniently connected electrically and respectively to a similar end portion of adjacent capacitor rolls.

My invention will be better understood from the following description when taken in connection with the accompanying drawing and the scope of my invention will be pointed out in the appended claims. In the drawing, Fig. 1 is a perspective view of a plurality of series connected capacitor rolls incorporating one embodiment of my invention assembled ready for installation in a case or container; Fig. 2 is a perspective view of the Fig 1 combination before assembly thereof; Fig. 3 is an end view of two capacitor rolls embodying a modification of my invention; Fig. 4 is an end view of two capacitor rolls embodying still another modification of my invention; Fig. 5 illustrates a cross section taken through a prior are capacitor roll employing a conventional tap strap and Fig. 6, by way of comparison, illustrates a cross section taken through a capacitor roll embodying my invention.

Referring to Fig. 2, each capacitor unit or sub-section 10 comprises a pair of longitudinal strips or foils of conducting material 11 and 12 and a pair of longitudinal strips 13 and 14 of insulating or dielectric material alternately disposed and wound into a compact roll which is flattened so as to have an elongated transverse cross section. The alternate strips of dielectric have a greater width than the strips of conducting material and project a sufficient distance beyond the longitudinal edges thereof so as to prevent short circuiting between alternately disposed conducting foils of opposite polarity. The description thus far applies to many rolled type prior art capacitors. However, instead of having additional turns of insulating material wound around the unit after the foils or conducting strips are cut and having tap straps inserted for making connections to the foils, the dielectric strips 13 and 14 are so cut that the outer transverse edges 15 and 16 thereof will be located respectively at opposite sides of a sub-section unit. In addition, conducting strip 11 which is adjacent the inner surface of dielectric strip 13 extends beyond the terminating outer edge 15 thereof and a portion of strip 11 adjacent the outer transverse edge 17 thereof is folded back around dielectric edge 15 and thereby exposed at one side of the unit while conducting strip 12 which is adjacent the inner surface of dielectric strip 14 extends beyond the terminating outer edge 16 thereof and a portion of strip 12 adjacent the outer transverse edge 18 thereof is folded back around dielectric edge 16 and thereby exposed at the opposite side of the unit. Although one or any number may be used, three of these units have been illustrated in Fig. 1 as having been pressed together side by side in alignment so that the exposed conducting portions at opposite sides of the middle or intermediate unit physically engages repectively an exposed conducting portion of an adjacent unit.

Thus, without the employment of tap straps or interconnecting wires, a plurality of such units may be electrically connected in series merely by pressing them together.

As a simpler modification of my invention, I have shown in Fig. 3 an end view of two identical capacitor units concerning each one of which the outer transverse edges 19 and 20 of a pair of wound dielectric strips are located respectively at opposite sides of the unit as was the case in the embodiment of Fig. 2. In this modification, however, the outer end portions of the pair of conducting strips of opposite polarity project beyond the terminating outer edges of the dielectric strips so that the outer transverse edges 21 and 22 of the conducting strips are positioned respectively beyond the terminating edges 19 and 20 of the dielectric strips at opposite sides of the unit.

In both the embodiments of Fig. 2 and Fig. 3 it is necessary to transversely terminate each dielectric strip and each conducting strip, the outer surface of which is adjacent thereto, at different points. To eliminate this necessity, I have illustrated in Fig. 4 another modification in which the terminating edges 23 and 24 respectively of a strip of dielectric material and a strip of conducting material at one side of a rolled unit are in alignment and thus may be cut at the same stroke of a severing means. Likewise, the terminating edges 23' and 24' respectively of another strip of dielectric material and another strip of conducting material of opposite polarity at the opposite side of the unit are in alignment and may also be cut at the same stroke of a severing means. Two or more such units are electrically interconnected in series by inserting the end portions adjacent the outer terminating edges of a conducting and a dielectric strip adjacent the outer surface of the conducting strip, at one side of a unit between an adjacent unit and a similar conducting end portion thereof so that the conducting end portions of the adjacent units are in physical overlapping and interlocking engagement as illustrated. This modification has an additional advantage in that such an arrangement provides more solid insulation between foils of one roll and foils of opposite polarity of an adjacent roll.

To connect a group or plurality of such sub-section units, electrically connected in series as hereinbefore described, with an external circuit or the terminals of a container or case, I provide a terminal arrangement at the ends of the group comprising a terminal support card or plate 25 of insulating material having a configuration similar to and outlining dimensions approximately equal to the elongated cross section of a sub-section. Each plate contains a pair of spaced slots or slits 26 and 27 extending respectively from opposite edges 28 and 29 of the plate for a short distance toward the inner portion thereof. A pair of flexible strips of conducting material 30 and 31 pass through and are frictionally engaged respectively in slots 26 and 27. The conducting strips have been so inserted in the slots that a minor portion of each, adjacent an end thereof, is on one side of the insulating plate while the major portion or balance of each strip is on the opposite side of the plate. The minor portion of each strip has been bent around the edge of the slot in which the strip has been inserted toward the inner portion of the plate so that one surface of the bent portion is substantially in engagement with a surface of the plate while the balance of the strips project from their respective slots substantially normal to the opposite surface of the plate. A terminal arrangement as described is then pressed against each end of the plurality of series connected sub-section units so that the bent over portions of the strips inserted in the slots of a plate are in physical contact with the outer end portion of a rolled conducting strip terminating at one side of an end unit. Figure 2 more clearly illustrates the relative position of the end units to the respective adjacent terminal support plates prior to being pressed together as illustrated by Fig. 1. The balance of the flexible terminal strips projecting from the opposite surface of the plates may be twisted about and soldered to a terminal lead or otherwise electrically connected to an external circuit. This assembly may conveniently be held together pending use or insertion into a container by a strap of material such as the strip of insulating material 32 illustrated in Fig. 1.

To illustrate one of the many advantages resulting from my invention, I have shown in Fig. 5 a cross section taken through a prior art two electrode capacitor employing a conventional tap strap 33 and dielectric strips 34 of constant width and, by way of comparison, I have illustrated in Fig. 6 a cross section taken through a capacitor having the same capacitance and voltage rating as the Fig. 5 capacitor but not employing tap straps. The broken lines in Figs. 5 and 6 represent the creepage path between the longitudinal edges of opposite polarity foils the length of which must be sufficient to prevent breakdown or short circuiting. It should be observed that because of the use of a tap strap, it has been necessary to employ a greater projection of the dielectric strips beyond the longitudinal edges of the Fig. 5 conducting strips in order to obtain the same creep distance. As a result, the overall transverse or axial dimension of the prior art roll is greater than the same dimension of a roll incorporating my invention. Since volume occupied is at a premium, obviously, the lesser the overall dimensions the greater the advantage. Moreover, less treating compound need be used which reduces the problem relative to the expansion and contraction of treating compounds with temperature changes. Finally, the weight and cost of a complete capacitor embodying my invention is less than a prior art capacitor having the same rating.

While I have, in accordance with the patent statutes, shown a particular embodiment and modifications thereof, other changes and modifications will be obvious to those skilled in the art, and I, therefore, aim in the appended claims to cover all such changes and modifications as fall within the true spirit and scope of my invention.

What I claim as new and desire to secure by Letters Patent of the United States is:

1. In a capacitor, a plurality of capacitor sub-section units adjacently positioned, each of said units comprising a pair of longitudinal strips of conducting material and a pair of longitudinal strips of dielectric material alternately disposed and wound into a roll, the outer transverse edges of said alternate strips of dielectric material being located respectively at opposite sides of said sub-section unit and a portion of said conducting strips adjacent the outer transverse edges thereof being folded back respectively around said terminating edges of said dielectric strips and exposed respectively at opposite sides of said sub-section unit.

2. In a capacitor, a plurality of capacitor subsection units, each of said units comprising a pair of longitudinal strips of conducting material and a pair of longitudinal strips of dielectric material alternately disposed and wound into a roll having an elongated transverse cross section, the outer transverse edges of said alternate strips of dielectric material being located respectively at opposite sides of said sub-section unit, a conducting portion adjacent the outer transverse edge of one of said conducting strips adjacent the inner surface of one of said dielectric strips being folded back around said outer terminating edge of said dielectric strip and exposed at one side of said sub-section unit, a conducting portion adjacent the outer transverse edge of the other of said conducting strips adjacent the inner surface of the other of said dielectric strips being folded back around said outer terminating edge of said other dielectric strip and exposed at the opposite side of said sub-section unit, said subsection units being aligned side by side with the axis of alignment normal to the elongated cross-section axes of said units and the conducting portion exposed at opposite sides of each intermediate unit physically engaging respectively an exposed conducting portion of an adjacent unit and an exposed conducting portion of each end unit physically engaging a pair of conducting terminal straps.

3. In a capacitor, a plurality of capacitor subsection units adjacently disposed side by side in alignment, each of said units comprising a pair of longitudinal strips of conducting material and a pair of longitudinal strips of dielectric material alternately disposed and wound into a roll having an elongated transverse cross section, the outer transverse edge of one of said conducting strips and the outer transverse edge of one of said dielectric strips the inner surface of which is adjacent the outer surface of said conducting strip being located at one side of said unit, the outer transverse edge of the other of said conducting strips and the outer transverse edge of the other of said dielectric strips the inner surface of which is adjacent the outer surface of said other conducting strip being located at the opposite side of said unit, the portions adjacent said terminating edges of said conducting strips at opposite sides of said unit being located respectively between an adjacent unit and a similar conducting end portion thereof in physical overlapping engagement with said similar portion and the end portions adjacent said terminating edges of said dielectric strips respectively adjacent the outer surface of said conducting strips being located respectively between an adjacent unit and said conducting overlap.

4. In a capacitor, a plurality of capacitor subsection units, each of said units comprising a pair of longitudinal strips of conducting material and a pair of longitudinal strips of die electric material alternately disposed and wound into a roll having an elongated transverse cross section, the outer transverse edges of said alternate strips of dielectric material being located respectively at opposite sides of said sub-section unit and a portion of said conducting strips adjacent the outer transverse edges thereof being folded back respectively around said terminating edges of said dielectric strips and exposed respectively at opposite sides of said sub-section unit, said sub-section units being aligned side by side with the axis of alignment normal to the elongated cross section axes of said units and the exposed portion of said conducting strips at opposite sides of each intermediate unit physically engaging respectively the corresponding exposed portion of an adjacent sub-section unit and means to electrically connect an end unit to an external terminal comprising a plate of insulating material having a shape similar to and outlining dimensions substantially equal to the elongated cross section of said sub-section units, a pair of spaced slots through said plate extending respectively from opposite edges of said plate a predetermined distance toward the inner portion thereof, a pair of flexible strips of conducting material respectively passing through and frictionally engaged in said slots, each of said conducting strips being transversely bent adjacent an end thereof around the edge of a slot toward the inner portion of said plate with a surface of the bent portion adjacent said end in physical engagement with a side of said plate and the opposite surface of said bent portion in physical engagement with the exposed portion of said end unit the balance of said flexible conducting strips projecting from their respective slots substantially normal to the opposite side of said plate.

5. A capacitor comprising a pair of longitudinal strips of conducting material and a pair of longitudinal strips of dielectric material alternately disposed and wound into a roll, the outer transverse edges of said alternate strips of dielectric material being located respectively at opposite sides of said roll and a portion of said conducting strips adjacent the outer transverse edges thereof being folded back respectively around said terminating edges of said dielectric strips and exposed respectively at opposite sides of said roll.

6. A capacitor comprising a plurality of longitudinal strips of conducting material and a plurality of longitudinal strips of dielectric material alternately disposed and wound into a roll, the outer transverse edges of said alternate strips of dielectric material respectively adjacent the innermost and outermost of said conducting strips being located respectively at opposite sides of said roll and a portion of said innermost and said outermost conducting strips adjacent the outer transverse edges thereof being folded back respectively around said terminating edges of said dielectric strips and exposed respectively at opposite sides of said roll.

7. In a capacitor, a plurality of capacitor subsection units, each of said units comprising a pair of longitudinal strips of conductive material and a pair of longitudinal strips of dielectric material alternately disposed and wound into a roll having an elongated transverse cross-section, the outer transverse edges of said alternate strips of dielectric material being located respectively at opposite sides of said sub-section unit and a portion of said conducting strips adjacent the outer transverse edges thereof being folded back respectively around said terminating edges of said dielectric strips and exposed respectively at opposite sides of said sub-section units, said sub-section units being aligned side by side with the axis of alignment normal to the elongated cross-section axes of said units and the conducting portions exposed at opposite sides of each intermediate unit physically engaging respectively an exposed conducting portion of an adjacent unit and means to electrically connect an end unit to an external terminal comprising a terminal support plate of insulating material, a slot through said plate, a flexible terminal strip of conducting material passing through and frictionally engaged in said slot, said conducting terminal strip being transversely bent adjacent an end thereof around the edge of said slot towards the inner portion of said plate with a surface of said bent portion adjacent said end in physical engagement with a side of said plate and the opposite surface of said bent portion in physical engagement with the said exposed conducting portion of said end unit, the balance of said flexible conducting strip projecting from said slot substantially normal to the opposite side of said plate.

8. In a capacitor, a plurality of capacitor subsection units, each of said units comprising a pair of longitudinal strips of conducting material and a pair of longitudinal strips of dielectric material alternately disposed and wound into a roll having an elongated transverse cross-section, the outer transverse edges of one of said conducting strips and of the outerly disposed strip of dielectric material in engagement therewith being located at one side of said roll, the outer transverse edges of the other of said conducting strips and of the outerly disposed strip of dielectric material in engagement therewith being located at the opposite side of said roll, and a portion of the faces of said conducting strips adjacent said terminating edges thereof at opposite sides of each intermediate unit and opposite to the respective faces in engagement with said outerly disposed strips of dielectric material physically engaging the corresponding face of the conducting strip of an adjacent unit.

JOHN H. WURSTER.

REFERENCES CITED

The following references are of record in the file of this patent:

UNITED STATES PATENTS

| Number | Name | Date |
|---|---|---|
| 1,850,105 | Higginbottom | Mar. 22, 1932 |
| 2,314,855 | Del Camp | Mar. 23, 1943 |

FOREIGN PATENTS

| Number | Country | Date |
|---|---|---|
| 573,398 | France | Mar. 10, 1924 |
| 372,695 | Great Britain | May 12, 1932 |